United States Patent
Bittel et al.

(10) Patent No.: US 8,035,647 B1
(45) Date of Patent: Oct. 11, 2011

(54) RASTER OPERATIONS UNIT WITH INTERLEAVING OF READ AND WRITE REQUESTS USING PCI EXPRESS

(75) Inventors: Donald A. Bittel, San Jose, CA (US); Paul MacDougal, Raleigh, NC (US); Manas Mandal, Palo Alto, CA (US); Colyn S. Case, Hyde Park, VT (US)

(73) Assignee: NVIDIA Corporation, Santa Clara, CA (US)

( * ) Notice: Subject to any disclaimer, the term of this patent is extended or adjusted under 35 U.S.C. 154(b) by 1126 days.

(21) Appl. No.: 11/467,132

(22) Filed: Aug. 24, 2006

(51) Int. Cl.
 *G09G 5/39* (2006.01)
 *G06F 13/14* (2006.01)
 *G06F 13/00* (2006.01)
(52) U.S. Cl. ............... 345/531; 345/520; 345/537
(58) Field of Classification Search .......... 345/530, 345/531, 536, 545, 520, 501, 537
 See application file for complete search history.

(56) References Cited

U.S. PATENT DOCUMENTS

| | | | | | |
|---|---|---|---|---|---|
| 5,801,717 | A | * | 9/1998 | Engstrom et al. | 345/539 |
| 5,937,204 | A | * | 8/1999 | Schinnerer | 345/531 |
| 6,801,203 | B1 | * | 10/2004 | Hussain | 345/506 |
| 7,328,956 | B2 | * | 2/2008 | Silverbrook et al. | 347/9 |
| 7,463,819 | B2 | * | 12/2008 | Law et al. | 386/124 |
| 7,538,772 | B1 | * | 5/2009 | Fouladi et al. | 345/535 |

* cited by examiner

*Primary Examiner* — Joni Hsu
(74) *Attorney, Agent, or Firm* — Kilpatrick Townsend & Stockton LLP

(57) ABSTRACT

A raster operations (ROP) unit interleaves read and write requests for efficiently communicating with a frame buffer via a PCI Express (PCI E) link or other system bus that provides separate upstream and downstream data transfer paths. One example of a ROP unit processes pixels in groups, performing read modify writeback sequences for each group. The read requests associated with pixels in a second group are advantageously interleaved with the writeback requests for pixels in the first group prior to sending the requests on the system bus.

20 Claims, 8 Drawing Sheets

RASTER OPERATIONS UNIT WITH INTERLEAVING OF READ AND WRITE REQUESTS USING PCI EXPRESS

BACKGROUND OF THE INVENTION

The present invention relates in general to updating pixel data in a frame buffer and in particular to a raster operations unit with interleaving of read and write requests using PCI Express (PCI-E) or a similar communication link.

Graphics processors are used to render images in many computer systems. In a typical rendering process, the graphics processor receives primitives (e.g., points, lines, and/or triangles) representing objects in a scene. In accordance with instructions provided by an application program, the graphics processor transforms each primitive to a viewing space, then determines which pixels of the image are covered by the primitive. For each pixel that is covered, the graphics processor computes a color and depth (or Z) value, e.g., by executing a pixel shader program provided by the application program. The color and depth values computed for each pixel are provided to a raster operations (ROP) unit, which stores the image pixels in a frame buffer. As the ROP unit receives new depth and color values for a pixel, it compares the new depth value to a previous depth value stored in the frame buffer and determines whether to write new data for that pixel to the frame buffer. If new data is to be written, the ROP unit updates the depth and color values in the frame buffer based on the new data. A typical ROP unit can perform a variety of color blending operations between existing pixels and new pixels.

The ROP unit generates many data transfer requests to and from the frame buffer for each image. To execute the process described above, each time the ROP unit receives a new pixel, it reads the old pixel (at least the depth value) from the frame buffer. If the pixel is to be changed, the color must also be read from the frame buffer so that it can be modified, and in the end, the modified color and depth are written back to the frame buffer. In some graphics systems, bandwidth between the ROP and the frame buffer can become a bottleneck, limiting system performance.

In one common approach to eliminating this bottleneck, the frame buffer is implemented in a memory device that is local to the graphics processor and dedicated to graphics use (referred to herein as a "graphics memory"). In these systems, the graphics processor is usually connected to the frame buffer by a wide, high-speed dedicated data path. This approach can be relatively expensive, requiring a large number of input/output (I/O) pins and consequently a large chip area.

For some low-cost or physically compact systems, it is desirable to avoid the extra cost associated with providing graphics memory. In these systems, sometimes referred to as "unified memory architectures" (UMA), the graphics processor generally uses an area of system memory to store the frame buffer. In a UMA system, the ROP unit communicates with the frame buffer using the bus that connects the graphics processor to the rest of the computer system.

Conventionally, buses for graphics devices have been implemented using protocols such as Peripheral Component Interconnect (PCI) or Accelerated Graphics Port (AGP). These protocols provide a "reversible" data path, with data moving "upstream" from the graphics processor to system memory via the same physical path as data moving "downstream." Data can move in only one direction at a time. Generally, some amount of overhead is associated with bus "turnaround," i.e., switching between upstream and downstream data transfers. For the repeated read-modify-write sequence of operations on the frame buffer performed by a typical ROP unit, this overhead can be considerable.

Consequently, in UMA systems using conventional bus protocols, the ROP unit is usually designed to minimize the number of times the bus is turned around. In one typical implementation, the ROP unit receives pixels to be processed in groups (e.g., 256 or 512 pixels). The ROP unit executes all of the read operations for the group and defers the writeback operations for the group until the last read is completed. The bus is turned around only twice per group (from read to write, then from write to read), reducing the overhead.

More recently, the PCI Express (PCI-E) "bus" protocol has been introduced. Unlike conventional buses, which provide reversible data transfer paths that are often shared by multiple devices, PCI-E provides each device with a dedicated "bidirectional" link that includes separate upstream and downstream data paths. Thus, on a PCI-E link data can flow in both directions at once. ROP implementations that are optimized for reversible data paths, which allow data to flow in only one direction at a time, use the PCI-E link in a relatively inefficient manner. It would, therefore, be desirable to provide a ROP unit that made more efficient use of a link protocol such as PCI-E.

BRIEF SUMMARY OF THE INVENTION

Embodiments of the present invention provide raster operations (ROP) units that interleave read and write requests for efficiently communicating with a frame buffer via a PCI Express (PCI-E) link or other system bus that provides separate upstream and downstream data transfer paths. In some embodiments, the ROP unit processes pixels in groups, performing read-modify-writeback sequences for each group. The read requests associated with pixels in a second group are advantageously interleaved with the writeback requests for pixels in the first group.

According to one aspect of the present invention, in a raster operations (ROP) unit of a graphics processor, a method is provided for updating pixel data in a frame buffer connected to the graphics processor using a system bus that includes a dedicated upstream data path and a dedicated downstream data path, which may be implemented, e.g., as a PCI-E link. New data for a first number of pixels is stored in a first input buffer, and new data for a second number of pixels is stored in a second input buffer. Read requests for transmission to the frame buffer are generated; each read request is associated with one of the input buffers and requests current data for one or more of the pixels for which new data is stored in the associated one of the input buffers. The current data requested in at least some of the read requests is received and modified based on the new data (e.g., using conventional raster operations such as depth testing and color blending). Write requests for transmission to the frame buffer are generated; each write request is associated with one of the input buffers and includes the modified data for one or more of the pixels stored in that one of the input buffers. A sequence of read requests and write requests for transmission to the frame buffer is formed such that a first one of the read requests associated with the pixels in the second input buffer precedes a last one of the write requests associated with pixels in the first input buffer. In some embodiments, read requests associated with the second input buffer are advantageously generated in parallel with generating write requests associated with the first input buffer. Thus, read requests associated with pixels from one input buffer and write requests associated with pixels from another input buffer are interleaved.

In some embodiments, the sequence of requests is formed by a process that includes determining whether a write request has been generated and determining whether a read request has been generated. In the event that only a write request has been generated, the write request is added to the sequence. In the event that only a read request has been generated, the read request is added to the sequence. In the event that both a read request and a write request have been generated, a decision algorithm is invoked to select between the read request and the write request. In one embodiment, the decision algorithm first determines whether a number of outstanding read requests exceeds a limit. If so, then the write request is selected. Once a write request has been selected, the decision algorithm may continue to select available write requests in preference to available read requests until a target number of write requests have been selected.

In some embodiments, the act of storing the new data in the second input buffer includes determining whether a current pixel for which new data is to be loaded into the second input buffer is also included in the pixels for which data was stored in the first input buffer. If so, then a flag is advantageously set to prevent the one of the read requests associated with the second input buffer that includes the current pixel from being transmitted before the one of the write requests associated with the first input buffer that includes the current pixel is transmitted.

In embodiments where the frame buffer stores data for tiles that each include multiple pixels, each of the write requests may advantageously include a request to write data for one of the tiles, and each of the read requests advantageously includes a request to read data for one of the tiles. Where this is the case, if different pixels of a same tile are stored in both the first input buffer and the second input buffer, a flag associated with the tile and the second input buffer may be set. When the flag is set, one or more sub-tile write requests are generated for the tile, with each of the sub-tile write requests including only pixels in the tile that are modified, so that newer data is not overwritten with older data.

According to another aspect of the present invention, a graphics processing device is configured to communicate with a frame buffer via a system bus that includes separate upstream and downstream data transfer paths (e.g., a PCI-E link). The graphics processing device includes a raster operations (ROP) unit. The ROP unit includes input buffers (including at least a first input buffer and a second input buffer), a read generator circuit, an update circuit, a write generator circuit, and arbitration logic. Each input buffer is configured to store new data for multiple pixels. The read generator circuit is configured to generate read requests for transmission to the frame buffer. Each read request is associated with one of the input buffers and requests current data for one or more of the pixels for which new data is stored in the associated input buffer. The update circuit is configured to receive the current data requested by the read generator and to modify the current data based on the new data provided by the input buffer. The write generator circuit is configured to generate write requests for transmission to the frame buffer. Each write request includes the modified data for one or more of the pixels modified by the update circuit. The arbitration logic circuit, which is coupled to the read generator circuit and the write generator circuit, is configured to form a sequence of read requests and write requests for transmission to the frame buffer. In the sequence of requests, a first one of the read requests associated with the pixels in the second input buffer precedes a last one of the write requests associated with pixels in the first input buffer.

In some embodiments, the graphics processing device also includes a filler module that is configured to load new data for a respective group of pixels into each of the input buffers. The ROP unit may be further configured such that the read generator circuit begins to generate read requests for pixels for which new data is stored in one of the input buffers after the filler module has finished loading new data into that one of the input buffers. In some embodiments, the ROP also includes a third input buffer configured to store new data for a third group of pixels; the filler module is advantageously configured to load new data for the third group of pixels while the write generator is generating write requests associated with the first group of pixels and the read generator is generating read requests associated with the second group of pixels.

The following detailed description together with the accompanying drawings will provide a better understanding of the nature and advantages of the present invention.

BRIEF DESCRIPTION OF THE DRAWINGS

FIGS. 2A-2C illustrate an operating principle of the present invention, with FIGS. 2A and 2B depicting a raster operations (ROP) unit that operates in a manner optimized for reversible buses such as PCI or AGP, while FIG. 2C illustrates a ROP unit that interleaves read and write requests according to an embodiment of the present invention;

DETAILED DESCRIPTION OF THE INVENTION

Embodiments of the present invention provide raster operations (ROP) units that interleave read and write requests for efficiently communicating with a frame buffer via a PCI Express (PCI-E) link or other system bus that provides separate upstream and downstream data transfer paths. In some embodiments, the ROP unit processes pixels in groups, performing read-modify-writeback sequences for each group. The read requests associated with pixels in a second group are advantageously interleaved with the writeback requests for pixels in the first group.

System Overview

Figure 1:
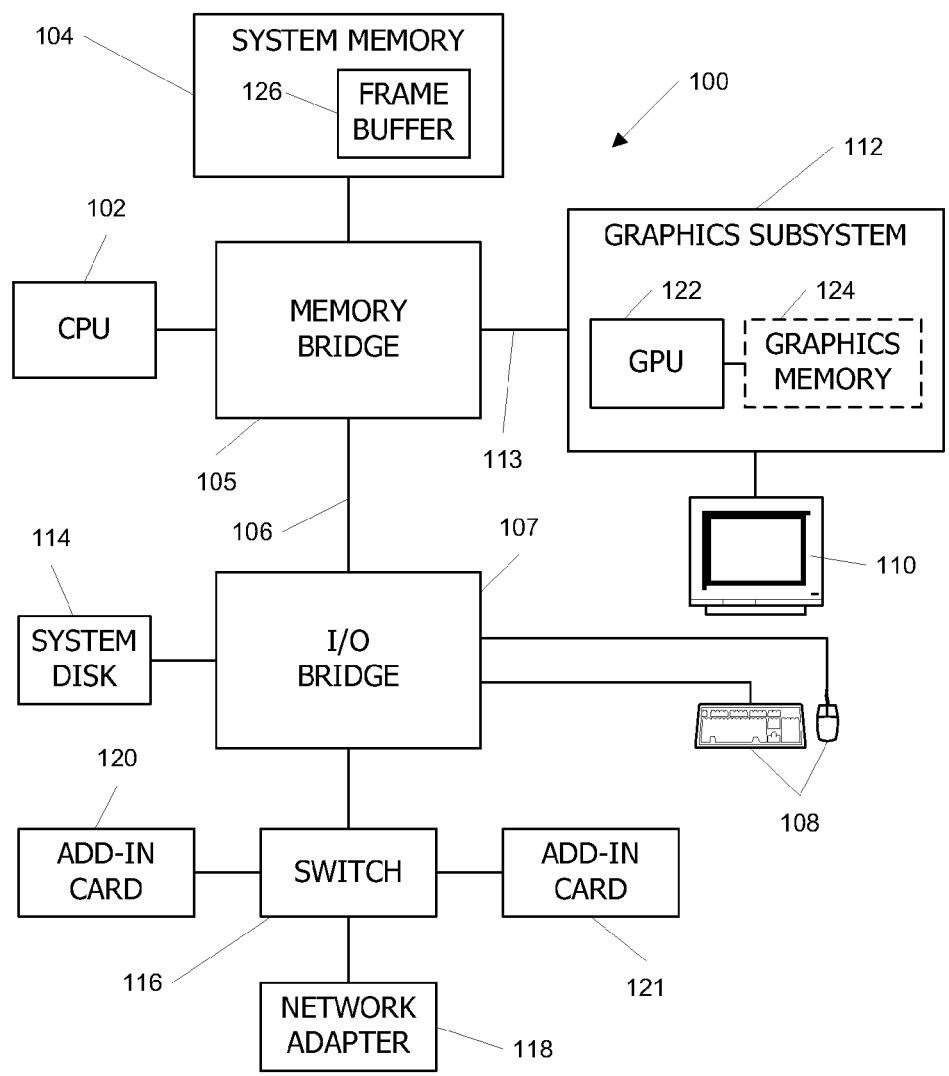
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a Hyper-Transport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other bidirectional communication path 113 that provides separate upstream and downstream data transfer paths. In one embodiment, communication path 113 is a PCI Express (PCI-E) link.

A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or other bus or point-to-point communication protocol(s), and connections between different devices may use different protocols as is known in the art.

Graphics processing subsystem 112 includes a graphics processing unit (GPU) 122, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also include a scanout module configured to deliver pixel data to display device 110.

In accordance with an embodiment of the present invention, pixel data generated by GPU 122 is stored in a frame buffer 126 implemented in system memory 104. As used herein, a "frame buffer" refers to a contiguous block of memory (where "contiguous" may be defined in a physical or virtual address space as desired) that stores per-pixel information for an image. In some embodiments, an image may have multiple frame buffers, including, e.g., a frame buffer for color values and a separate frame buffer for depth (Z coordinate) values. In addition, the frame buffer(s) 126 may be double buffered so that a rendering pipeline of GPU 122 can write pixel data for one image to a "back" buffer while a scanout (or display) pipeline of GPU 122 reads pixel data to be displayed from a previously rendered "front" buffer.

A dedicated local graphics memory 124 is an optional feature of system 100. It is to be understood that although GPU 122 in some embodiments may be used with a dedicated local graphics memory 124, GPU 122 is designed for a unified memory architecture (UMA) configuration, in which graphics memory 124 is absent and GPU 122 stores all pixel data in one or more frame buffers 126 in system memory 104.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104 or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

As noted above, embodiments of the present invention are advantageously employed in a UMA graphics subsystem 112, in which no dedicated graphics memory device 124 is provided and frame buffer 126 is maintained in system memory 104. GPU 122 accesses frame buffer 126 via a high-speed bus (or link) that provides separate upstream and downstream data transfer paths. In one embodiment, the high-speed bus is PCI-E.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Interleaving Read Requests and Write Requests

Figure 2A:
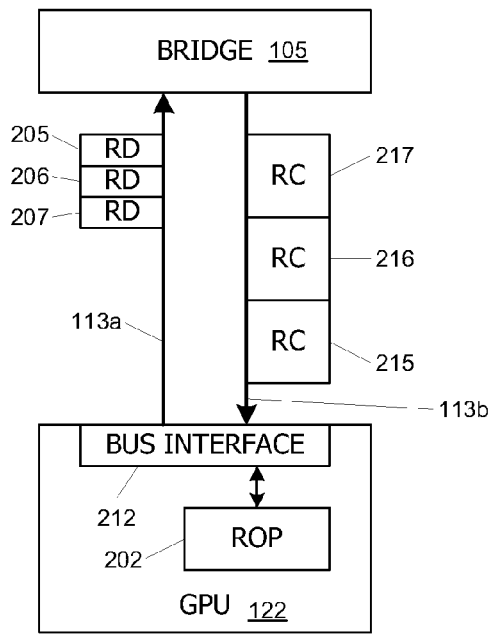
Figure 2B:
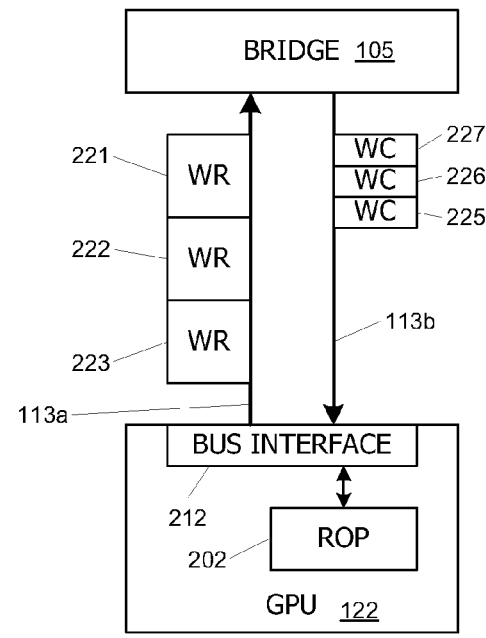
Figure 2C:
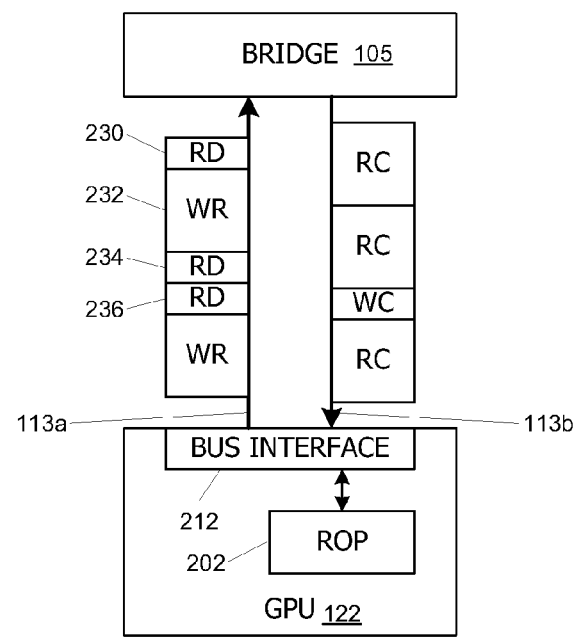

FIGS. 2A-2C illustrate an operating principle of the present invention. GPU 122 and bridge chip 105 of FIG. 1 are connected by a PCI-E link (or other bus) 113 that has an upstream data path 113a and a separate downstream data path 113b. As illustrated in FIG. 2A, a ROP unit 202 within GPU 122 generates read (RD) requests 205-207, which are delivered to upstream data path 113a by a bus interface unit 212 of GPU 122. Bridge chip 105 receives the read requests and forwards them to system memory 104 (not explicitly shown in FIG. 2A). System memory 104 provides the requested data from frame buffer 126, and bridge chip 105 returns the data to GPU 122 in the form of "read completion" (RC) packets 215-217 via downstream data path 113b. Bus interface 212 receives the RC packets and delivers the associated data to ROP 202. Those skilled in the art will recognize that read requests 205-207 are relatively small in comparison to read completions 215-217. Thus, the time used to transfer a read request (e.g., read request 205) on upstream data path 113a is generally less than the time used to transfer a read completion (e.g., read completion 215) on downstream data path 113b.

As illustrated in FIG. 2B, ROP unit 202 also generates write (WR) requests 221-223, which are also delivered to upstream data path 113a by bus interface 212. Each write request includes data to be written to a frame buffer 126 in system memory 104. Bridge chip 105 receives the requests and forwards them to system memory 104. System memory 104 returns a confirmation that the write operation was completed, and bridge chip 105 returns this confirmation to GPU 122 in the form of "write completion" (WC) packets 225-227 via downstream data path 113b.

In FIGS. 2A and 2B, ROP unit 202 operates in a manner consistent with reversible buses such as PCI or AGP. Specifically, in FIG. 2A, ROP unit 202 is in a "read phase" in which it generates a number of read requests (e.g., 32) and receives the data. In FIG. 2B, ROP unit 202 is in a "write phase," in which it generates a similar number of write requests. Grouping read requests and write requests in this manner is useful for buses with reversible data paths because each transition from reading to writing (or vice versa) requires waiting for the data path to clear, then reconfiguring the data path through an exchange of signals to allow data to flow in the opposite direction.

As FIGS. 2A and 2B show, this manner of operation is inefficient for a bidirectional link such as PCI-E. In FIG. 2A, while ROP unit 202 is in read phase, downstream data path 113b is very busy, but upstream data path 113a is only lightly used. Conversely, in FIG. 2B, while ROP unit 202 is in write phase, upstream data path 113a is very busy while downstream data path 113b is only lightly used.

In accordance with an embodiment of the present invention, ROP unit 202 does not operate with distinct read and write phases. Instead, read requests and write requests are advantageously interleaved, as illustrated in FIG. 2C, allowing a read request on upstream data path 113a to be followed by either a read request or a write request. For instance, read request 230 is followed by a write request 232, while read request 234 is followed by a read request 236. On downstream data path 113b, read and write completions are also interleaved. The result is that upstream link 113a and downstream link 113b can be kept approximately equally busy by ROP unit 202.

ROP with Interleaved Read and Write Requests

Figure 3:
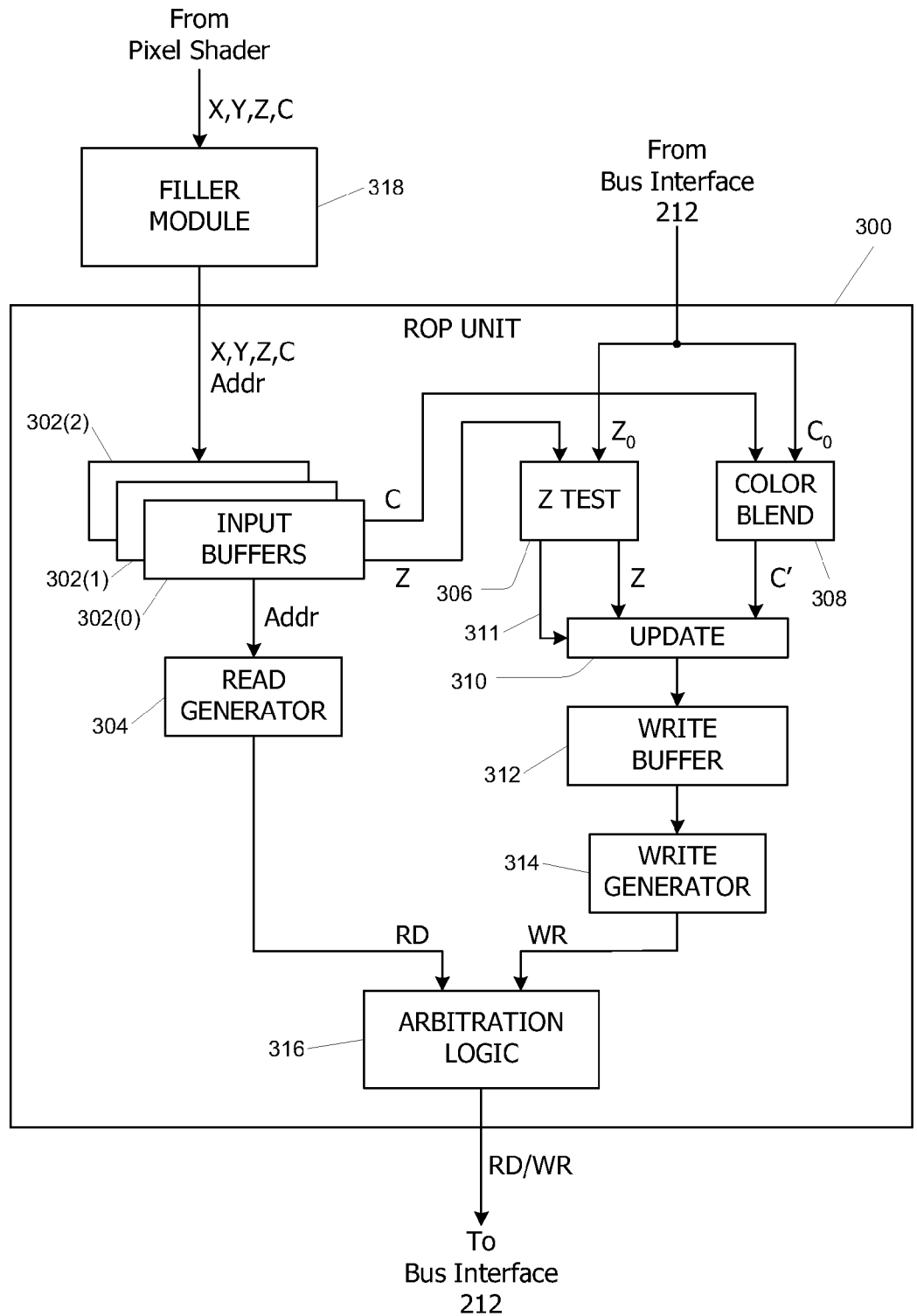
FIG. 3 is a block diagram of a ROP unit that generates interleaved read and write requests according to an embodiment of the present invention.

FIG. 3 is a block diagram of a ROP unit 300 that generates interleaved read and write requests according to an embodiment of the present invention. ROP unit 300 operates on pixel data stored in a set of three (or more) input buffers 302. ROP unit 300 includes a read generator 304, a Z test circuit 306, a color blend circuit 308, an update control circuit 310, a write buffer 312, a write generator 314, and arbitration logic 316.

In operation, a filler module 318 receives pixel data including screen coordinates (X, Y), depth (Z), and color (C) from a pixel shader that executes in GPU 122 of FIG. 1. In one embodiment, the pixel data is produced by a pixel shader of generally conventional design executing in GPU 122. Filler module 318 receives the pixel shader output and loads that data into input buffers 302, filling each buffer in turn. For example, when input buffer 302(0) is sufficiently filled with pixels, filler module 318 releases buffer 302(0) for processing by ROP unit 300, then begins to load pixels into buffer 302(1), and so on. When all three buffers have been filled and ROP unit 300 has finished processing buffer 302(0), filler module 318 begins loading pixels into buffer 302(0) again.

In one embodiment, filler module 318 determines an address (Addr) associated with pixel coordinates (X, Y) and uses the address to determine where, within the input buffer 302 currently being filled, the color and depth values should be stored. Examples of buffer organization and filling techniques that may be used in input buffers 302 and filler module 318 are described below.

ROP unit 300 processes the pixels from each input buffers 302, in turn, into frame buffer 126 of FIG. 1. More specifically, when filler module 318 releases buffer 302(0) for ROP processing, read generator 304 begins to generate read requests to obtain current information from frame buffer 126 for the pixels represented in buffer 302(0). In some embodiments, read generator 304 requests both depth and color information for each pixel; in other embodiments, read generator 304 requests depth information first, then requests color information later for any pixels for which ROP unit 300 determines that an update to color information is needed.

Read generator 304 sends the read (RD) requests to arbitration logic 316, which arbitrates between read requests from read generator 304 and write (WR) requests from write generator 314, as described below. Arbitration logic 316 sends the read request to a bus interface (e.g., bus interface 212 as shown in FIG. 2), which transmits the request via upstream data path 113a to frame buffer 126.

Pixel data, including depth ($Z_0$) and color ($C_0$) values, read from frame buffer 126 is returned via downstream data path 113b and bus interface 212 to ROP unit 300. (Pixel data received from the frame buffer is referred to herein as "current pixel data.") Depth values are delivered to Z test unit 306, and color values are delivered to color blend unit 308. Z test unit 306 in one embodiment performs a conventional depth test to determine whether the new depth coordinate Z (in temporary buffer 302(0)) is closer to the viewer than the current depth coordinate $Z_0$. If the current depth coordinate is closer, Z test unit 306 signals update logic 310 (via path 311) that no update is required. If the new depth coordinate is closer, then Z test unit 306 signals update logic 310 (via path 311) that an update is required and also provides the new depth coordinate Z to update logic 310.

Color blend unit 308 applies an appropriate operation to blend the current color value $C_0$ with the new color value C. Conventional color-blending operations may be used; for instance, the new color value might replace the current color value, or the two might be blended in accordance with "alpha" transparency factors included in the color values. It is to be understood that particular color blending operations are not critical to the present invention, and a detailed description has been omitted. Color blend unit 308 provides the blended color value C' to update logic 310.

If Z test unit 306 signals that an update is required, update unit 310 writes the updated depth and color values (Z and C') to write buffer 312. In some embodiments, write buffer 312 collects all of the updates for all pixels in the current input buffer 302(0) before any write operations are initiated, allowing ROP unit 300 to update multiple pixels using a single write request, as described below.

Write generator 314 generates write (WR) requests for the updated pixels in write buffer 312. The write request includes the updated depth and color values to be written back to the address in frame buffer 126 from which the pixel was read. Write generator 314 sends the write requests to arbitration logic 316. Arbitration logic 316 sends each write request to a bus interface (e.g., bus interface 212 as shown in FIG. 2), which transmits the request via upstream data path 113a to frame buffer 126. In some embodiments, ROP unit 300 receives a write completion from frame buffer 126 via downstream data path 113b and bus interface 212.

Arbitration logic 316 advantageously allows write requests for the pixels associated with one input buffer, e.g., buffer 302(0) to be interleaved with read requests for pixels associated with the next input buffer, e.g., buffer 302(1). Specifically, arbitration logic 316 separately queues read requests from read generator 304 and write requests from write generator 314. Arbitration logic 316 includes decision logic circuits configured to determine whether to send a read request or a write request at each cycle. In one embodiment, if only one type of request is queued, a request of that type is sent. If requests of both types are available, a decision is made. The decision is advantageously based on information about bus activity associated with previous requests. In general, the goal is to roughly balance activity on the upstream and downstream data paths (as shown, e.g., in FIG. 2C); for instance, when the downstream data path is busy returning read data, the upstream data path can be used to send write data. Specific examples of arbitration algorithms that may be implemented in arbitration logic 316 are described below.

It will be appreciated that ROP unit 300 is illustrative and that variations and modifications are possible. For instance, it is not required that current depth coordinates and color values be read from the frame buffer at the same time; in some embodiments, it may be desirable to use separate read operations at different times. For instance, if depth coordinates and color values are stored in different frame buffers 126 in system memory 104 (FIG. 1), it may be more efficient to read a depth coordinate first, determine whether a color update is needed, and read the color value only for those pixels for which a color update is needed. In some embodiments, update unit 310 communicates with read generator 304 to indicate which pixels require color values to be read from frame buffer 126. To the extent that color updates are not performed for all pixels, this can reduce the total number of read requests ROP unit 300 makes to frame buffer 126.

In addition, the update decision logic and color blending logic may be modified as desired. For instance, a stencil test or other visibility test(s) may be implemented in addition to or instead of the Z test described herein. Any type of color blending or updating operations may be supported. Those skilled in the art will recognize that the particular internal logic of the ROP unit is not critical to the present invention.

In embodiments described herein, the ROP unit advantageously interleaves write requests associated with pixels in one input buffer with read requests associated with pixels in the next input buffer. For example, when the first input buffer 302(0) is ready for processing, ROP 300 begins issuing read requests for the pixels in input buffer 302(0). As the requested data is received, ROP 300 generates updated data and loads write buffer 312 with updated pixel data to be written back to frame buffer 126. Once all of the updated data for pixels in input buffer 302(0) has been generated, ROP 300 begins generating write requests to transfer the updated pixel data associated with input buffer 302(0) to frame buffer 126. If the next input buffer 302(1) becomes available before ROP 300 has finished writing back the updated pixel data for input buffer 302(0), ROP 300 begins to interleave the read requests for pixels in input buffer 302(1) with write requests for pixels from input buffer 302(0).

To obtain the maximum benefit from interleaving, it is desirable to have at least two input buffers available to ROP unit 300 most or all of the time. A third input buffer 302(2) is advantageously provided so that filler module 318 can load pixel data into one input buffer (e.g., buffer 302(2)) while ROP unit 300 is processing two other input buffers (e.g., reading from buffer 302(1) and writing back updated data for buffer 302(0)). Those skilled in the art will appreciate that filter module 318 (which does not perform off-chip memory access) can be made to fill input buffers fast enough to keep up with ROP unit 300, so that as long as three input buffers 302 are present, ROP unit 300 will have access to two buffers most if not all of the time.

The present invention, however, is not restricted to three input buffers; any number of buffers may be used as long as ROP unit 300 has access to two buffers at least some of the time. To coordinate filling and reading of input buffers (e.g., so that filler module 318 does not overwrite pixels that have not yet been processed by ROP unit 300), ROP unit 300 and filler module 318 may use conventional semaphores or other signaling techniques for managing access to a shared resource.

Arbitration Algorithms

As noted above, arbitration logic 316 of FIG. 3 determines, on a per-cycle basis, whether to send a read or write request to bus interface 212 (FIG. 2). When only one type of request (read or write) is available, a request of that type is advantageously sent. When requests of both types are available, arbitration logic 316 makes a decision as to which type to send. Examples of arbitration algorithms that can be used for making the read/write decision will now be described.

In one embodiment, arbitration logic 316 is configured with a limit (Rmax) on the number of outstanding read requests. As long as the current number of outstanding read requests is below this limit, arbitration logic 316 selects read requests in preference to write requests whenever both types of requests are available. Once the number of outstanding read requests reaches the limit, arbitration logic 316 begins to select write requests in preference to reads. In some embodiments, once arbitration logic 316 has switched to preferring writes, it is desirable to keep selecting writes for at least some minimum number of writes. For instance, there might be a (small) turnaround penalty at the upstream end of the data path (e.g., in system memory 104) associated with switching between read and write; sending more than one write request at a time reduces any such penalty.

Figure 4A:
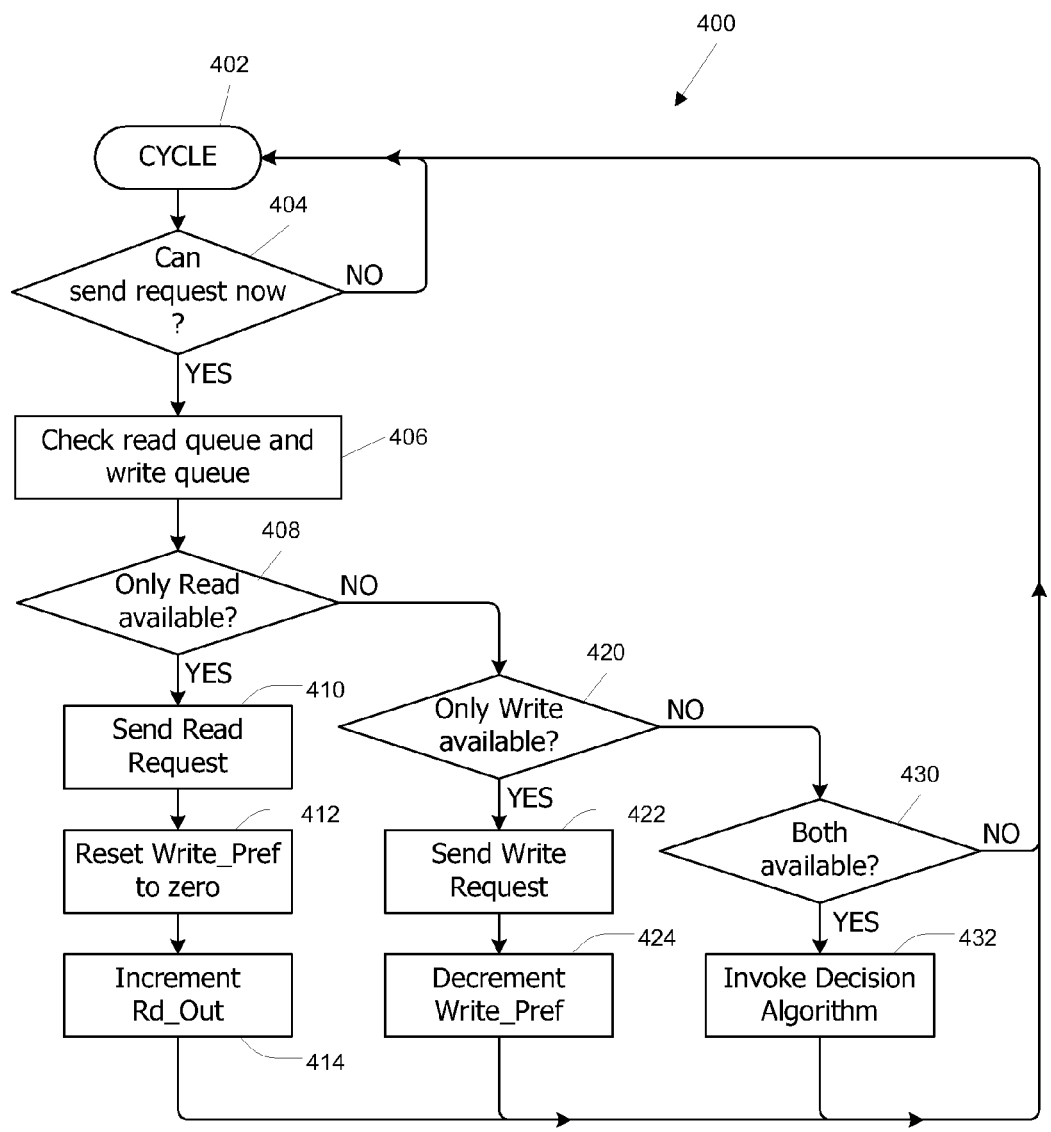
FIGS. 4A and 4B illustrate an arbitration process for interleaving read and write requests that may be implemented in a ROP unit according to an embodiment of the present invention.
Figure 4B:
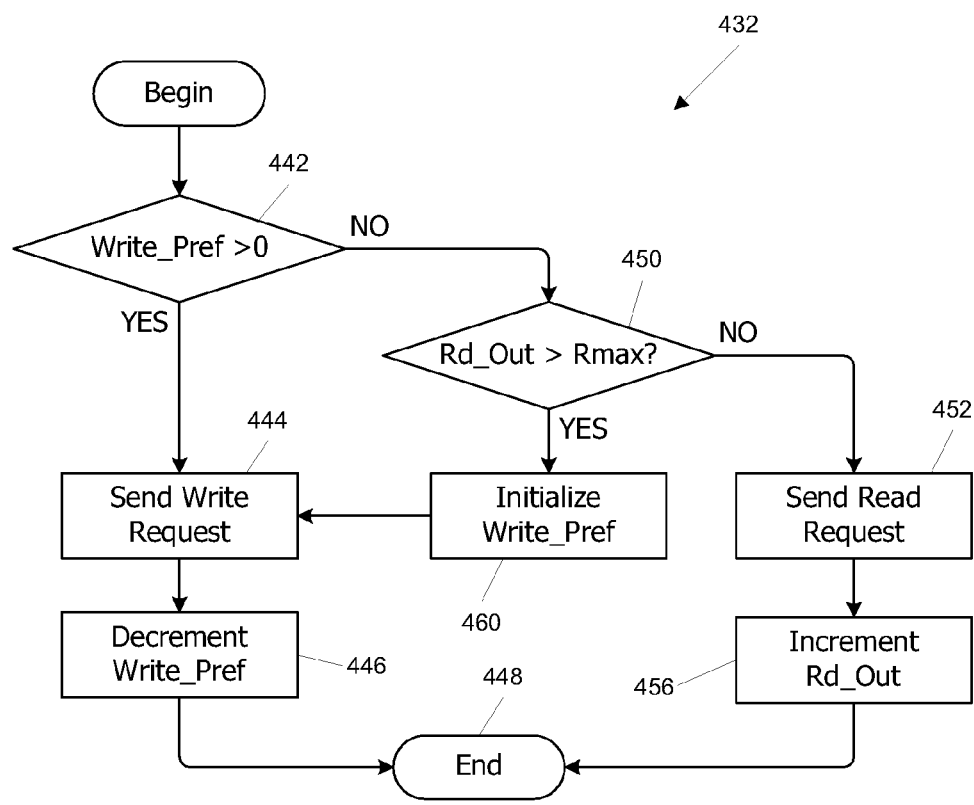

FIGS. 4A and 4B illustrate an arbitration process 400 that may be implemented in arbitration logic 316 according to an embodiment of the present invention. Process 400, depicted in FIG. 4A, is repeated for each cycle 402 of the bus clock (or other clock). In process 400, arbitration logic 316 maintains a counter that counts the number of outstanding read requests (Rd_Out) and a write-preference counter (Write_Pref) that is used to determine whether a write request is to be preferred over a read request at any given time. Use of these counters will be described below. Initially, both counters are advantageously set to zero.

At step 404, it is determined whether a request can be sent in the current cycle. In one embodiment, bus interface 212 (FIG. 2C) monitors the total number of outstanding requests. Once the number of outstanding requests reaches a limit, bus interface 212 blocks ROP unit 300 from sending any additional requests until at least one response to an earlier request is received. In another embodiment, arbitration unit 316 tracks the number of outstanding ROP requests and sends additional requests only when the number of outstanding ROP requests is below a limit. If no requests can be sent this cycle, process 400 waits for the next cycle 402.

If the total number of requests does not exceed the limit, then at step 406 process 400 checks the read queue and write queue to determine which types of requests (read, write, or both) are available to be sent. If only a read request is available (decision step 408), a read request is sent at step 410. At step 412, the write-preference counter Write_Pref is reset to zero. At step 414, the Rd_Out counter (the number of outstanding read requests) is incremented, and the cycle ends with process 400 returning to step 402.

If only a write request is available (decision step 420), a write request is sent at step 422. At step 424, the write-preference counter Write_Pref is decremented (if it is not already zero). The cycle ends with process 400 returning to step 402.

If both a read request and a write request are available (decision step 430), a decision algorithm is invoked at step 432 to determine whether to send the read request or the write request during the current cycle. FIG. 4B illustrates a decision algorithm that may be used at step 432. At step 442, it is determined whether the write preference counter Write_Pref is greater than zero. If so, then arbitration logic 316 is currently in write-preference mode, and at step 444, the write request is sent. At step 446, the write preference counter Write_Pref is decremented. Decision algorithm 432 ends at step 448.

If, at step 442, the write preference counter is zero, then writes are not preferred. At step 450, it is determined whether the number Rd_Out of outstanding read requests exceeds a limit Rmax. If the number Rd_Out does not exceed the limit, then at step 452, the read request is sent. At step 456, the outstanding read request counter (Rd_Out) is incremented, and at step 448, decision algorithm 432 ends.

If the number Rd_Out exceeds the limit, then write preference mode is entered. At step 460, the write preference count Write_Pref is initialized to a nonzero value (e.g., 4 or 8); at step 444, the write request is sent, and the algorithm 432 continues as described above.

Initially, the write preference counter is set to zero, so that read requests are favored in decision logic algorithm 432. This remains the case until the number of outstanding read requests reaches the limit Rmax. At that point, the write preference counter is initialized to a nonzero value, and write requests become favored in decision logic algorithm 432 until such time as either the write preference counter counts down to zero or a read request is sent due to the unavailability of a write request (which, as shown at step 412 of FIG. 4A, resets the write preference counter).

It will be appreciated that the arbitration algorithm described herein is illustrative and that variations and modifications are possible. Steps described as sequential may be executed in parallel, order of steps may be varied, and steps may be modified or combined.

Other decision algorithms may also be used at step 432. For example, in an embodiment using PCI-E, the number of outstanding requests that a particular device can support is limited to a maximum value. In one embodiment, arbitration logic 316 monitors the number of outstanding requests and attempts to keep that number as close to the maximum as possible. For instance, when the number of outstanding requests is small, arbitration logic 316 may prefer read requests, which are smaller, allowing more requests to be sent in a given time period. When the number of outstanding requests is close to the limit, arbitration logic 316 may prefer write requests, which are larger, so that fewer requests are sent in a given time period. In still other embodiments, conventional round robin, least-recently serviced, or other arbitration algorithms may be used.

Input buffer Structure

In some embodiments, pixel data in input buffers 302 of FIG. 3 is organized so as to exploit locality of pixel data in frame buffer 126, thereby reducing the number of memory accesses required to process the input buffer. In general, the optimal arrangement of pixels in input buffers 302 depends in part on the organization of frame buffer 126. An example will now be described.

Figures 5A, 5B:
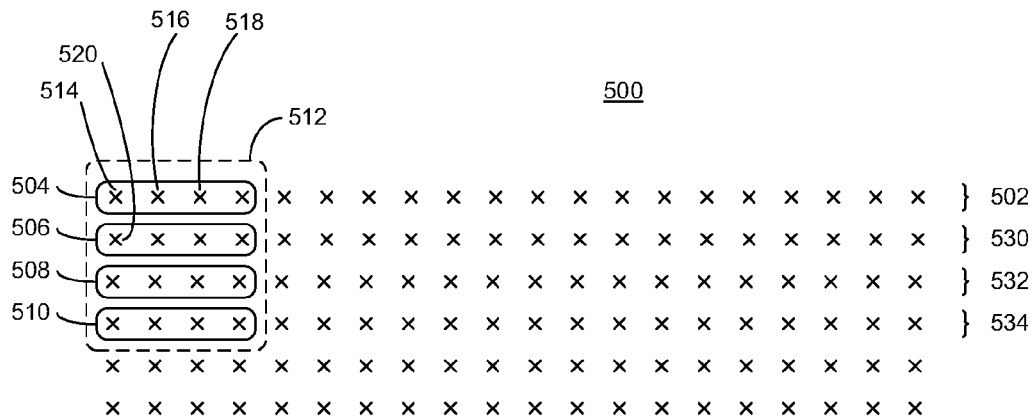
FIG. 5A illustrates a tiled frame buffer organization that may be implemented in some embodiments of the present invention.
FIG. 5B illustrates an input buffer according to an embodiment of the present invention.

FIG. 5A illustrates a "tiled" frame buffer organization that may be implemented in frame buffer 126. Each symbol "x" represents a pixel in an array 500 of pixels. Array 500 of pixels is made up of lines of pixels, such as lines 502, 530, 532, and 534. Also shown in FIG. 5A is a representative tile 512, which is a p-pixel by q-pixel rectangular area of pixels. In this particular example, p and q are both equal to 4; in other words, the rectangular area is actually a square area in this case. More generally, a "tile" is an area of pixels that comprises pixels from multiple lines of pixels in an array. Thus, tile 512 includes pixels from lines 502, 530, 532, and 534.

In one embodiment, pixel data for a tile is stored in frame buffer 126 (FIG. 1) on a per-line basis, with the pixels of each line of the tile being stored at a single memory address. For purposes of illustration, it is assumed that each memory address stores 16 bytes (128 bits), with 4 bytes being used for each pixel; pixel 514 would occupy the first four bytes of a particular address, pixel 516 the next four bytes of that address, and so on. If data for pixels in block 504 on line 502 is stored at a particular memory address, data for pixels in block 506 on line 530 would be stored at the following memory address, and so on. In other words, tile 512 corresponds to four consecutive addresses in the frame buffer. In an embodiment where each address stores 16 bytes, tile 512 advantageously occupies 64 bytes at four consecutive addresses that can be accessed as a unit using a single PCI-E request. Thus, ROP unit 300 of FIG. 3 can generate read and write requests for a tile of pixels, rather than generating a separate request for each pixel.

It is to be understood that other tiles within array 500 can be defined and stored in a similar fashion, with tiles having identical rectangular (e.g., square) dimensions being positioned directly above, directly below, directly to the right, and directly to the left of one another. Other techniques for dividing an array of pixels into adjacently arranged tiles of pixels may be used. Parameters such as the number of bits used to represent each pixel and number of bits of storage available at each memory address may also vary depending on the implementation.

FIG. 5B illustrates organization of an input buffer 302(0) of FIG. 3 according to an embodiment of the present invention; it is to be understood that other input buffers 302 may have similar organization. Input buffer 302(0) has a number (E) of entries 552. Each entry includes a number of slots 554 sufficient to store all pixels of a tile 512 of pixel array 500 of FIG. 5A. For instance, each tile in FIG. 5A includes 16 pixels, and each entry in input buffer 302(0) of FIG. 5B has 16 slots 554. More generally, if frame buffer 126 stores data arranged in tiles of p×q pixels and stores n bytes per pixel, then each entry in input buffer 302(0) advantageously stores p×q×n bytes.

The number E of entries may be selected as desired. In some embodiments, the number of entries is chosen to be large enough that if read requests for all entries were sent consecutively, no latency would be expected between sending the last read request and receiving the data from the first read request. For instance, in some embodiments using PCI-E, a read latency is approximately 27 ns, so the number of entries is made large enough that sending a read request for each entry consumes approximately 27 ns. In other embodiments, E might be 24, 32 or some other number as desired.

Filler module 318 of FIG. 3 advantageously loads pixels into input buffer 302(0) such that pixels in the same tile appear in the same entry, with each pixel in the position within the tile that it would occupy in frame buffer 126. For instance, for tile 512 of FIG. 5A, pixel 514 would be loaded into slot 554(0) of an entry (e.g., entry 552(0)), pixel 516 into slot 554(1) of the same entry 552(0), and so on. ROP unit 300 then generates one read request for each entry 552 in input buffer 302(0) that includes at least one pixel, regardless of the number of pixels that are actually present in that entry 552. A bit mask (not explicitly shown in FIG. 5B) may be associated with each entry 552 and may indicate which slots 554 in that entry 552 include valid pixel data.

In some embodiments, the entries 552 are not correlated with the arrangement of tiles in frame buffer 126. For instance, when filler module 318 receives a first pixel, it loads that pixel into the appropriate slot 554 of the first entry 552(0) in buffer 302(0), regardless of which tile the pixel belongs to. As subsequent pixels of the same tile are received, those pixels are also loaded into slots 554 of the first entry 552(0). When a pixel of a different tile is received (regardless of which tile), that pixel is loaded into the appropriate slot 554 of the next available entry 552(1). In this manner, filler module 318 can populate input buffer 302(0) until all entries 552 include at least one pixel.

Filler module 318 advantageously does not overwrite pixels in input buffer 302(0) during loading because it cannot be assumed that a new update should overwrite a previous update. In one embodiment, when filler module 318 receives a second update for a pixel that is already present in input buffer 302(0), it advantageously stops loading input buffer 302(0), releases input buffer 302(0) for ROP processing, and begins loading the next input buffer 302(1). Thus, in some instances, input buffer 302(0) might include some unpopulated entries 552 when it is released to ROP unit 300.

It will be appreciated that the input buffer organization described herein is illustrative and that variations and modifications are possible. The number of entries and number of slots per entry may be varied as desired. In some embodiments, the number of bytes of data per pixel is a configurable system parameter, and the number of slots in each entry in the input buffer may be configured based on the entry size (which is fixed) and the number of bytes of data per pixel.

In addition, a filler module may handle groups of pixels in parallel. In some embodiments, the filler module receives data for quads (2×2 grids) of pixels and loads the pixels of each quad into the appropriate four slots in a single entry. In addition, in some embodiments, when a second update for the same pixel is encountered during buffer filling, that update may be held back while updates for other pixels continue to be loaded into the input buffer; updates for different pixels can be reordered as long as the order of updates for each pixel is preserved.

It should be noted that write buffer 312 of FIG. 3 advantageously has a similar organization to input buffer 302(0), so that all modified pixels in a tile can be written back using a single write request. Where this is the case, ROP unit 300 advantageously defers generating any write requests for a particular input buffer 302 until all of the updated information for that input buffer has been loaded into write buffer 312; as with the read requests, this reduces the total number of requests required. Thus, in one embodiment, ROP unit 300 reads an entire tile (e.g., 64 bytes), updates one or more pixels within that tile, then writes back the entire tile including the modifications. (Any frame buffer pixels in the tile that were not modified are simply overwritten with the original data during the writeback operation.)

Preserving Data Coherence

As noted above, in embodiments of the present invention, ROP unit 300 advantageously interleaves write requests for pixels in a first input buffer with read requests for pixels in a later-filled input buffer. It is possible that updates to the same pixel may appear in both input buffers; if a later read occurs before an earlier write, data coherence could be lost.

Figure 6:
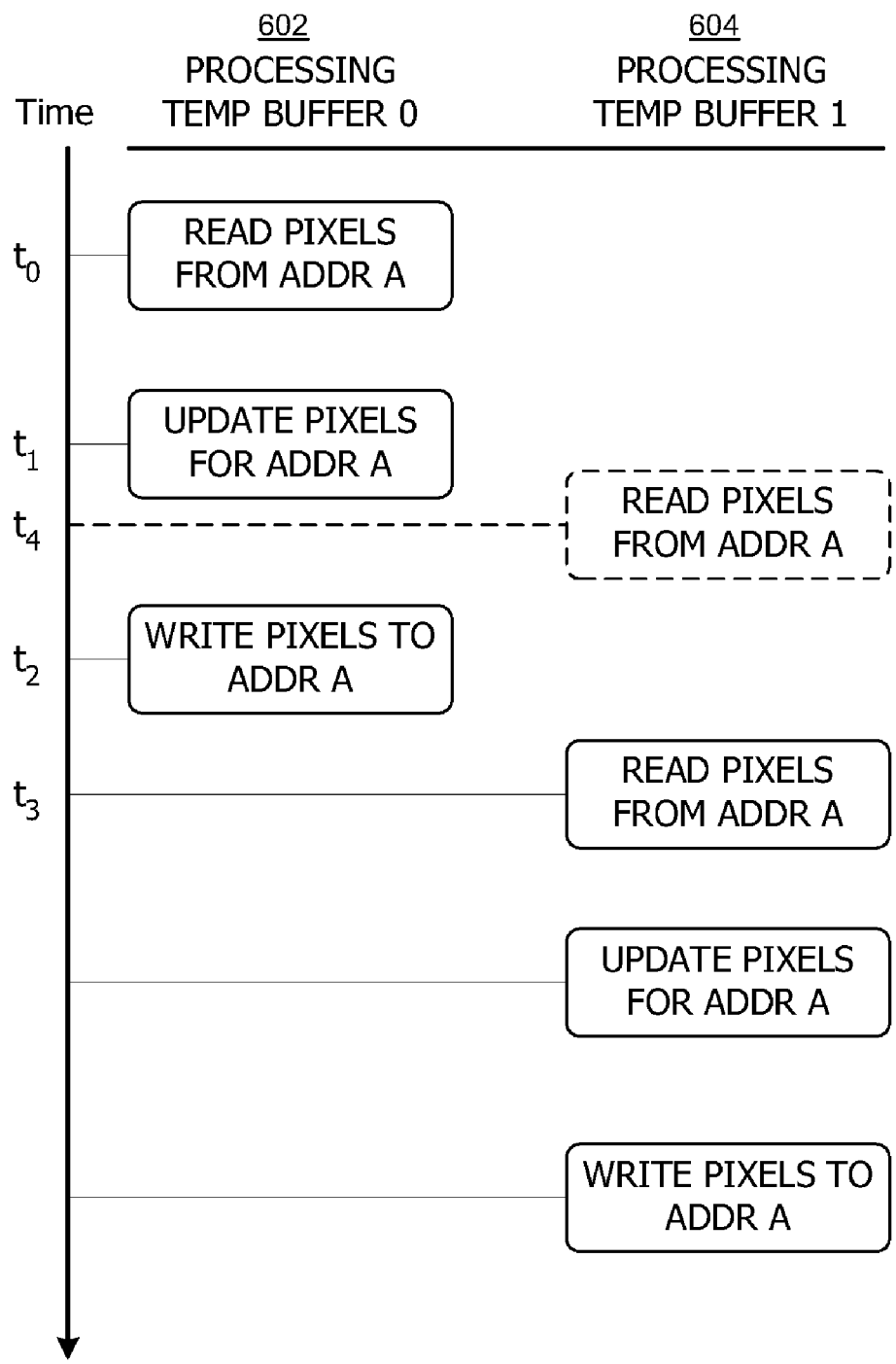
FIG. 6 is a timeline illustrating a race condition that can occur in some embodiments of the present invention.

FIG. 6 is a timeline illustrating a race condition that can occur in some embodiments of the present invention. In FIG. 6, time advances downward along the vertical axis. The first column 602 shows events associated with processing of pixels from a first input buffer, e.g., buffer 302(0), and the second column 604 shows events associated with processing of pixels from the next input buffer, e.g., buffer 302(1).

Input buffer 302(0) is processed first: pixels from an address (A) in frame buffer 126 are read at time $t_0$, updated at time $t_1$, and written back to address A at time $t_2$. To preserve data coherence, during processing of input buffer 302(1), pixels from address A should be read at a time $t_3$ that is later than $t_2$. However, due to interleaving of write requests associated with buffer 302(0) and read requests associated with buffer 302(1), it is possible for the second read from address A to occur at a time $t_4$ that is before time $t_2$. As a result of the race condition, the old pixel data used to process input buffer 302(1) might or might not be the correct data and a nondeterministic error could result.

Conventional ROP implementations avoid this race condition by deferring all processing of input buffer 302(1) until all writeback requests for pixels associated with input buffer 302(0) are completed. Embodiments of the present invention advantageously detect and flag potential race conditions so that read and write operations can be sequenced to the extent necessary to avoid errors while still preserving at least some of the benefit of interleaving.

For example, as FIG. 6 shows, if the same pixel appears in two consecutive input buffers, a race condition could occur. In one embodiment during filling of each input buffer, e.g., buffer 302(1), filler module 318 maintains information as to which pixels were included in the immediately previous input buffer, e.g., buffer 302(0). If a pixel in the current input buffer 302(1) duplicates a pixel in the immediately previous input buffer 302(0), the filler module sets a "no interleave" flag for input buffer 302(1) (or just for the entry in buffer 302(1) that contains the duplicate pixel).

When ROP 300 receives input buffer 302(1) for processing, it detects the no interleave flag and defers all read requests for buffer 302(1) (or just the read request for the affected entry if the flag is set on a per-entry basis) until all writes for the previous input buffer 302(0) have been finished. More specifically, where the no interleave flag is set on a per-buffer basis, read generator 304 detects the flag and does not queue any read requests for the new buffer 302(1) until write generator 314 indicates that the last write for the previous buffer 302(0) has been sent. Where the no interleave flag is set on a per-entry basis, read generator 304 detects the flag and does not queue a request corresponding to any flagged entry until write generator 314 indicates that the last write for the previous buffer 302(0) has been sent. It is to be understood that in embodiments where the no interleave flag is set on a per-entry basis, any number of entries in a single buffer 302 can be flagged.

In embodiments where multiple pixels are read and written using a single request (e.g., as in the tiled frame buffer embodiment described above with reference to FIGS. 5A and 5B), a race condition can also arise if different pixels of the same tile appear in consecutive input buffers. For instance, referring to FIG. 5A, suppose that input buffer 302(0) included updates for pixels 516 and 518 of tile 512, while input buffer 302(1) included an update for pixel 514. If the read request for tile 512 associated with input buffer 302(1) were to precede the write request for tile 512 associated with input buffer 302(0), stale data for pixels 516 and 518 would be read and could, during the writeback operation associated with input buffer 302(1), overwrite newer data.

Accordingly, in some embodiments of the present invention, filter module 318 detects and flags instances where different pixels of the same tile appear in consecutive input buffers 302. In one embodiment, each entry in each input buffer 302 has a "byte write" flag. If a tile in the current input buffer, e.g., buffer 302(1), is the same as a tile in the immediately previous input buffer, e.g., buffer 302(0), but contains updates for different pixels, filler module 318 sets the byte write flag for that entry.

When ROP 300 receives input buffer 302(1), it detects the byte write flag and performs per-pixel writeback(s) for the affected tile, rather than writing the entire tile. More specifically, write generator 314 detects the byte write flag and generates one or more smaller ("sub-tile") write requests that include only the pixels that were updated by input buffer 302(1). In one embodiment, each sub-tile write request includes data for one or more updated pixels; any number of updated pixels can be included in a single sub-tile write request.

Figure 7:
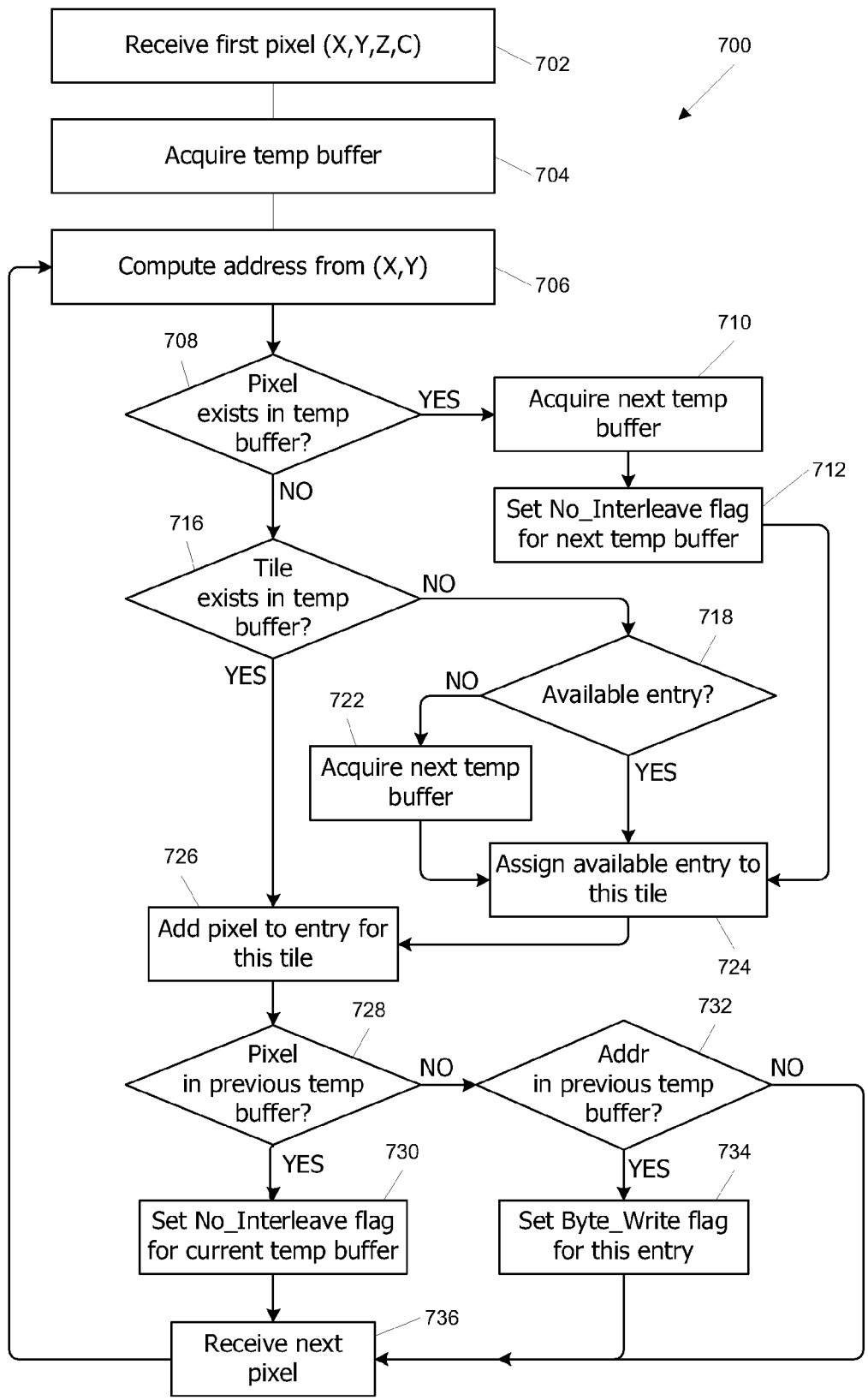
FIG. 7 is a flow diagram of a process for filling an input buffer according to an embodiment of the present invention that avoids the race condition of FIG. 6.

FIG. 7 is a flow diagram of a process 700 for filling an input buffer 302 that can be implemented in filler module 318 according to an embodiment of the present invention. Filling process 700 detects the race conditions described above and sets no interleave or byte write flags.

At step 702, a first pixel is received, e.g., from a conventional pixel shader. In one embodiment, the received pixel includes screen coordinates (X, Y), a depth coordinate (Z), and a color value (C). At step 704, filler module 318 acquires access to an input buffer 302 to be filled. At step 706, filler module 318 computes an address (Addr) for the pixel in frame buffer 126 based on the screen coordinates (X, Y); conventional address computation techniques may be used. In some embodiments, the address includes a base address representing the location of the tile to which the pixel belongs (referred to herein as a "tile address") and an offset representing the position of the pixel within the tile. At step 708, filler module 318 determines whether the pixel is already present in the current input buffer. In one embodiment, this determination is based on the pixel address (tile address and offset) computed at step 706.

As noted above, it is not desirable for filler module 318 to overwrite pixel data in an input buffer. Accordingly, if the pixel is already present in the current input buffer 302, filler module 318 acquires the next input buffer 302 at step 710 and sets the "no interleave" flag for the new buffer at step 712. The pixel will then be loaded into the new buffer as described below. When the next input buffer 302 is acquired, filler module 318 advantageously stores information as to which pixels were included in the previous input buffer and releases that buffer for use by ROP unit 300.

If, at step 708, the pixel does not already exist in the current input buffer, filler module 318 proceeds to step 716 to determine whether the tile already is present in the current input buffer 302. In one embodiment, this determination is based on the tile address computed at step 706. If the tile is present, the pixel will be loaded into the entry corresponding to that tile as described below.

If, at step 716, the tile is not already present, filler module 318 assigns an entry in input buffer 302 to the tile. Specifically, at step 718, it is determined whether the current input buffer 302 has an available entry (i.e., an entry not yet assigned to any tile). If so, then the next available entry is assigned to the tile at step 720; for instance, referring to FIG. 5B, the tile address may be stored in the address field of the assigned entry. If no further entries are available, filler module 318 acquires the next input buffer 302 at step 722 and assigns an available entry in that buffer to the current tile at step 720. As noted above, when the next input buffer 302 is acquired, filler module 318 advantageously stores information as to which pixels were included in the previous input buffer 302 and releases that buffer for use by ROP 300.

Once the entry for the current tile has been identified or assigned, at step 726 the pixel is added to the entry assigned to the current tile. Filler module 318 then determines whether the no interleave or byte write flag should be set by comparing the address of the current pixel to the stored addresses of pixels from the previous input buffer. More specifically, at step 728, filler module 318 determines whether the pixel was also present in the previous input buffer; if so, then the no interleave flag is set at step 730. If the pixel was not present in the previous input buffer, then at step 732, it is determined whether the tile to which the pixel belongs was present in the previous input buffer. If so, then the byte write flag is set at step 734. In any case, at step 736, filler module 318 receives the next pixel and returns to step 706 to process that pixel. Any number of pixels may be processed using process 700, and filler module 318 may cycle through the available input buffers any number of times in the course of generating an image.

It will be appreciated that the filling process described herein is illustrative and that variations and modifications are possible. Steps described as sequential may be executed in parallel, order of steps may be varied, and steps may be modified or combined. Further, other techniques for avoiding race conditions may be substituted for the no interleave and byte write flags described herein. For instance, if the bus protocol supports byte masking during writeback (which is not the case for PCI-E), the race condition related to different pixels of the same tile could be averted by performing byte-masked writes in all instances. Byte masking, as is known in the art, entails including with the write request (or write data) information indicating which bytes of the write data should actually be written to the target device. In other embodiments, data forwarding techniques might be used to avoid race conditions: for instance, read generator 304 could be configured to detect whether a tile to be read is present in write buffer 312 and if so, to retrieve the data for that tile directly from write buffer 312 rather than via a read request to frame buffer 126.

Further Embodiments

While the invention has been described with respect to specific embodiments, one skilled in the art will recognize that numerous modifications are possible. For instance, the number, size and organization of input buffers may be varied from that shown. Internal processing of pixels by the ROP unit may also be modified as desired; the present invention may be beneficial in any ROP that implements read-update-writeback processing behavior. As noted above, the present invention may advantageously be used in cases where the ROP accesses a frame buffer that is not in a dedicated graphics memory local to the graphics processor, so that the read and write requests travel over a bus or other communication link that is a shared system resource. PCI-E has been used as an example, but other communication links that provide separate upstream and downstream paths may be substituted.

Thus, although the invention has been described with respect to specific embodiments, it will be appreciated that the invention is intended to cover all modifications and equivalents within the scope of the following claims.

What is claimed is:

1. A method for communicating data between a raster operations unit (ROP) of a graphics processing device and a frame buffer via a system bus that includes separate upstream and downstream data transfer paths, the method comprising:

storing new data for a first plurality of pixels in a first input buffer;

storing new data for a second plurality of pixels in a second input buffer;

generating a plurality of read requests for transmission to the frame buffer, each read request being associated with one of the input buffers, each read request requesting current data for one or more of the pixels for which new data is stored in the associated one of the input buffers;

receiving the current data requested in at least some of the read requests;

modifying the current data based on the new data;

generating a plurality of write requests for transmission to the frame buffer, each write request being associated with one of the input buffers and including the modified data for one or more of the pixels stored in that one of the input buffers; and forming a sequence of read requests and write requests for transmission to the frame buffer, wherein the sequence is formed such that the read requests associated with the pixels in the second input buffer are interleaved with the write requests associated with pixels in the first input buffer, wherein forming the sequence includes:

in the event that only a read request is ready for transmission, adding the read request to the sequence;

in the event that only a write request is ready for transmission, adding the write request to the sequence; and in the event that both a read request and a write request are ready for transmission, selecting between the read request and the write request based on information about system bus activity associated with previous requests such that activity on the upstream and downstream data transfer paths is approximately balanced.

2. The method of claim 1 wherein selecting between the read request and the write request includes:

determining whether a number of outstanding read requests exceeds a limit; and selecting the write request in the event that the number of outstanding read requests exceeds the limit.

3. The method of claim 2 wherein selecting between the read request and the write request further includes:

in the event that the write request is selected, continuing thereafter to select available write requests in preference to available read requests until a target number of write requests have been selected.

4. The method of claim 1 further comprising:

prior to storing the new data for the first plurality of pixels, receiving access to the first input buffer; and prior to storing the new data for the second plurality of pixels, receiving access to the second input buffer.

5. The method of claim 1 wherein the act of storing the new data for the second plurality of pixels includes:

determining whether a current pixel of the second plurality of pixels is also a pixel of the first plurality of pixels; and in the event that the current pixel of the second plurality of pixels is also a pixel of the first plurality of pixels, setting a flag that prevents the one of the read requests associated with the second input buffer that includes the current pixel from being transmitted before the one of the write requests associated with the first input buffer that includes the current pixel is transmitted.

6. The method of claim 1 wherein the frame buffer stores data for a plurality of tiles, each tile including a plurality of pixels, wherein each of the write requests includes a request to write data for one of the tiles, and wherein each of the read requests includes a request to read data for one of the tiles, wherein the act of storing the new data for the pixels of the second plurality of pixels includes:

in the event that different pixels of a same tile are included in both the first plurality of pixels and the second plurality of pixels, setting a flag associated with the tile and the second input buffer.

7. The method of claim 6 wherein, in the event that the flag is set, the act of generating the plurality of write requests associated with the second input buffer includes:

generating one or more sub-tile write requests for the tile, wherein each of the sub-tile write requests includes only one or more pixels in the tile that are modified.

8. The method of claim 1 wherein the upstream data path and downstream data path are implemented as a PCI Express (PCI-E) link.

9. The method of claim 1 wherein the act of modifying includes:

comparing a new depth coordinate included in the new data to a current depth coordinate included in the current data; and based on the comparison, determining whether a modification to the current data is required.

10. The method of claim 9 wherein the act of modifying further includes, in the event that a modification to the current data is required:

determining a modified color value based on one or both of a new color value included in the new data or a current color value included in the current data; and determining a modified depth coordinate based on the new depth coordinate.

11. A graphics processing device configured to communicate with a frame buffer via a system bus that includes separate upstream and downstream data transfer paths, the graphics processing device comprising a raster operations (ROP) unit that includes:

a plurality of input buffers including at least a first input buffer and a second input buffer, each input buffer being configured to store new data for a plurality of pixels;

a read generator circuit configured to generate a plurality of read requests for transmission to the frame buffer, each read request being associated with one of the input buffers, each read request requesting current data for one or more of the pixels for which new data is stored in the associated one of the input buffers;

an update circuit configured to receive the current data requested by the read generator and to modify the current data based on the new data;

a write generator circuit configured to generate a plurality of write requests for transmission to the frame buffer, each write request including the modified data for one or more of the pixels modified by the update circuit; and an arbitration logic circuit coupled to the read generator circuit and the write generator circuit, the arbitration logic circuit being configured to form a sequence of read requests and write requests for transmission to the frame buffer, wherein the arbitration logic circuit is further configured to form the sequence such that the read requests associated with the pixels in the second input buffer are interleaved with the write requests associated with pixels in the first input buffer wherein the interleaving is based on information about system bus activity associated with previous requests and wherein the interleaving is performed such that activity on the upstream and downstream data transfer paths is approximately balanced.

12. The graphics processing device of claim 11 further comprising:

a filler module configured to load new data for a respective group of pixels into each of the plurality of input buffers, wherein the ROP unit is further configured such that the read generator circuit begins to generate read requests for pixels for which new data is stored in one of the input buffers after the filler module has finished loading new data into that one of the input buffers.

13. The graphics processing device of claim 12 wherein the plurality of input buffers further includes a third input buffer configured to store new data for a third group of pixels and wherein the filler module is configured to load new data for the third group of pixels while the write generator is generating write requests associated with the first group of pixels and the read generator is generating read requests associated with the second group of pixels.

14. The graphics processing device of claim 11 wherein the system bus is a PCI Express (PCI-E) bus.

15. In a raster operations (ROP) unit of a graphics processor, a method of updating pixel data in a frame buffer connected to the graphics processor using a system bus that includes a dedicated upstream data path and a dedicated downstream data path, the method comprising:
receiving new data for a plurality of pixels in a first group of pixels;
receiving new data for a plurality of pixels in a second group of pixels;
generating a plurality of first read requests, each of the first read requests requesting current data for at least one pixel of the first group of pixels from the frame buffer;
in response to the first read requests, receiving the current data for the pixels of the first group from the frame buffer via the downstream data path;
based on the new data for the pixels of the first group, modifying the current data for at least one of the pixels of the first group;
generating a plurality of first write requests, each of the first write requests including modified data for at least one of the pixels of the first group;
generating a plurality of second read requests, each of the second read requests requesting current data for at least one pixel of the second group of pixels from the frame buffer; and
forming, from the first read requests, the second read requests, and the first write requests, a sequence of requests to be transmitted to the frame buffer via the upstream data path, wherein at least the first write requests and the second read requests are interleaved,
wherein forming the sequence of requests includes:
in the event that a second read request is ready for transmission when no first write request is ready for transmission, adding the second read request to the sequence;
in the event that a first write request is ready for transmission when no second read request is ready for transmission, adding the first write request to the sequence; and
in the event that both a second read request and a first write request are ready for transmission, selecting between the second read request and the first write request based on information about system bus activity associated with previous requests such that activity on the upstream and downstream data transfer paths is approximately balanced.

16. The method of claim 15 further comprising:
loading the new data for the pixels in the first group of pixels into a first input buffer, wherein the act of receiving the new data for the pixels in the first group includes receiving access to the first input buffer; and
loading the new data for the pixels in the second group of pixels into a second input buffer, wherein the act of receiving the new data for the pixels in the second group includes receiving access to the second input buffer.

17. The method of claim 16 wherein the act of storing the new data for the second plurality of pixels includes:
determining whether a current pixel of the second plurality of pixels is also a pixel of the first plurality of pixels; and
in the event that the current pixel of the second plurality of pixels is also a pixel of the first plurality of pixels, preventing the one of the second read requests that includes the current pixel from being transmitted before the one of the first write requests that includes the current pixel is transmitted.

18. The method of claim 16 wherein the plurality of read requests includes a first read request associated with the first input buffer and a second read request associated with the second input buffer, the method further comprising:
in response to the second read request, receiving the current data for at least one pixel of the second plurality of pixels from the frame buffer via the downstream data path;
based on the new data for the at least one pixel, modifying the current data for at least one of the pixels of the second plurality of pixels; and
generating a further write request, the further write request including modified data for the at least one pixel.

19. The method of claim 15 wherein the frame buffer stores data for a plurality of tiles, each tile including a plurality of pixels, wherein each of the first write requests includes a request to write data for one of the tiles, and wherein each of the second read requests includes a request to read data for one of the tiles,
wherein the act of loading new data for the pixels of the second group includes:
in the event that different pixels of a same tile are included in both the first group of pixels and the second group of pixels, setting a flag associated with the tile and the second input buffer.

20. The method of claim 19 wherein, in the event that the flag is set, the act of generating the plurality of second write requests includes:
generating one or more sub-tile write requests for the tile, wherein each of the sub-tile write requests includes only one or more pixels in the tile that are modified.

* * * * *